July 27, 1954
E. O. AICHELE
2,684,774
SEALING CLOSURE FOR CONTAINERS
AND METHOD OF PRODUCING SAME
Filed Aug. 16, 1950
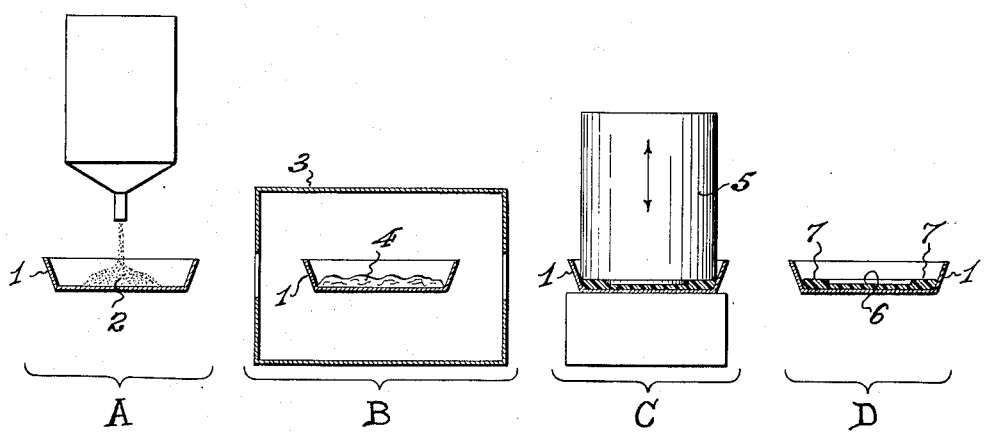
INVENTOR.
Ernest O. Aichele,
BY George D. Richards,
Attorney Patented July 27, 1954

2,684,774

UNITED STATES PATENT OFFICE 2,684,774

SEALING CLOSURE FOR CONTAINERS AND METHOD OF PRODUCING SAME

Ernest O. Aichele, Hillside, N. J., assignor of sixty per cent to Joseph J. Mascuch, Maplewood, N. J.

Application August 16, 1950, Serial No. 179,803

2 Claims. (Cl. 215—40)

This invention relates to sealing closures for containers, such as caps of the crown and screw types; and the invention has reference, more particularly, to the provision of novel resilient sealing liner means within such closures or caps, and to the method of preparing and applying such sealing liner means to the closures or caps.

The invention has for an object to provide novel sealing liner means for container closures or caps, said liner means being formed from a vinyl resin, viz. vinyl chloride with which is compounded, by a novel method of preparation hereinafter disclosed, a non-oleaginous plasticizer, viz. dicyclohexyl phthalate, in such proportions that, when the compound is applied and molded to the closure or cap to provide a sealing liner therefor, the liner body formed thereby will possess the characteristics of resilience, required for sealing conformation to the container mouth to which the closure or cap is applied; toughness; inertness, so as to be unaffected by the content of the container when the latter is closed and sealed by the closure or cap; and self-adherence to the closure or cap body so as to become unitary therewith; the resultant liner body being free of oily content, and therefore non-bleeding in use.

The invention has for a further object to provide a novel method of applying the liner compound to a container closure or cap and forming the sealing liner body therefrom.

The method of applying the liner compound to a closure or cap and forming the sealing liner within the latter is schematically illustrated by the accompanying drawing.

According to this invention, the vinyl resin compound, from which the sealing liner body is produced, comprises vinyl chloride and a non-oleaginous plasticizer, viz. dicyclohexyl phthalate initially in a dry powder state. These ingredients are compounded in approximately equal relative proportions by weight, i. e. 50% vinyl chloride and 50% plasticizer approximately. The compound is prepared in accordance with the following procedure:

The powdered dicyclohexyl phthalate is first reduced to a liquid state by melting or fusing the same by applied heat not in excess of 150° F., and preferably at a temperature maintained between 130° and 150° F. After the powdered dicyclohexyl phthalate is thus reduced to and while maintained in a liquid condition, the vinyl chloride (in powdered state) is added thereto, and, by suitable agitation, thoroughly and intimately intermingled therewith until a uniform intermixture of the two is obtained.

After the vinyl chloride and dicyclohexyl phthalate which serves as the plasticizer in the compound are intermingled in the manner above explained, the mixture is allowed to cool down to room temperature. As the mixture cools it sets to a hard and brittle condition. The hard and brittle compound is thereupon broken up and pulverized, by grinding or equivalent treatment, whereby to reduce the compound to a dry powdered state, in which condition it is ready for use in the formation therefrom of a sealing liner body and its application to the interior of a container closure or cap.

The method of forming and applying the vinyl resin compound, prepared as above stated, whereby to provide a container closure or cap with a sealing liner produced therefrom is schematically illustrated in the accompanying drawing, and comprises the following steps:

(1) Into an inverted closure or cap 1 is deposited a predetermined or measured quantity 2 of the powdered vinyl resin compound; this step being indicated at A in said drawing.

(2) The closure or cap 1 with the contained deposit 2 of powdered compound is next placed in or passed through an oven 3 which is heated to and maintained at a temperature of from 350° to 375° F., at which temperature the deposit 2 of powdered compound is caused to quickly (i. e. within one to one and one-half minutes) fuse into a soft plastic mass 4 ready for shaping or molding into sealing liner body form; this step being illustrated at B in the drawing.

(3) The closure or cap 1 with its contained mass of soft plastic compound 4 is removed from the oven 3 and immediately subjected to the action of a molding or shaping plunger or die 5. Said plunger or die 5 is caused to enter the inverted closure or cap 1 and engage and press the plastic mass of compound 4 into sealing liner body form, while at the same time disposing the same in adhered operative assembled relation to the interior of the closure or cap 1. The plunger or die 5 not only shapes and positions the sealing liner body in adhered relation to and within the interior of the closure or cap 1, but said plunger or die being cold chills the compound so as to solidify and set the latter in permanent form; this step is illustrated at C in the drawing.

(4) Upon withdrawal of the plunger or die 5 the closure or cap 1 is equipped with an integral, single material sealing liner body 6, which is operatively attached in unitary relation thereto, thus completing the structure ready for use; the completed closure or cap being shown at D in the drawing.

The compound comprising vinyl chloride and the non-oleaginous plasticizer dicyclohexyl phthalate, when formed and set in the manner described, provides a permanent, non-absorbent sealing liner body which possesses and retains a degree of resiliency adapted to render said body efficiently conformable to the mouth of a container to which the sealing closure or cap is affixed, so that a tight, leak-proof seal between the container and closure or cap is assured.

Since the disclosed vinyl resin compound from which the sealing liner body is produced is free from oily or other liquid or fluid constituents, the same is non-bleeding in use, and consequently deleterious contamination of the content of a container sealed thereby, due to oily or other exudation from the sealing liner body, is entirely avoided.

The cross-sectional shape or contour of the sealing liner body may be suitably varied, as may in any particular case be desired, by modifying the face of the molding plunger or die 5 accordingly. In most cases, however, and especially with respect to a sealing liner body for use with a closure or cap of the crimped or crown type, it is preferable to so shape the sealing liner body as to provide the same with a thickened annular section 7 adjacent the cap wall, thereby to provide maximum resilient and cushioned conformation of the liner body to the container mouth for assured sealing contact therewith.

Having now described my invention, I claim:

1. A method of producing a resilient sealing liner directly within a container closure which comprises introducing into a cold inverted closure shell a predetermined quantity of a dry pulverulent vinyl resin compound comprising equal parts by weight of powdered polyvinyl chloride and powdered non-oleaginous dicyclohexyl phthalate intimately intermingled one with the other, subjecting the closure shell and its content of said compound to influence of heat at a temperature of 350° to 375° F. for a period of one to one and one-half minutes, whereby to fuse the pulverulent compound into a soft asymmetrical plastic mass, and then, after removing the closure shell and its fused content of said compound from the influence of heat, immediately thereafter subjecting said plastic mass to the pressure of a cold molding plunger whereby to both shape said mass to a symmetrical liner formation while at the same time chilling and thus setting said formation in adhered relation to the interior of the closure shell.

2. A closure comprising a metallic shell and a resilient sealing liner formation molded in said shell and adhered to the internal surface of said shell, said formation being produced from a fused vinyl resin compound composed of substantially equal parts by weight of intermingled initially powdered polyvinyl chloride and non-oleaginous dicyclohexyl phthalate.

References Cited in the file of this patent

UNITED STATES PATENTS

| Number | Name | Date |
|---|---|---|
| 1,486,937 | Taliaferro | Mar. 18, 1924 |
| 1,706,209 | Busch | Mar. 19, 1929 |
| 1,738,612 | Recht | Dec. 10, 1929 |
| 1,764,662 | Tomlin | June 17, 1930 |
| 1,806,739 | Busch | May 26, 1931 |
| 1,900,963 | Warth | Mar. 14, 1933 |
| 1,956,012 | Egan | Apr. 24, 1934 |
| 1,984,752 | McManus | Dec. 18, 1934 |
| 2,238,681 | Dorough | Apr. 15, 1941 |
| 2,392,238 | Fankhanel | Jan. 1, 1946 |
| 2,498,453 | Schaerer | Feb. 21, 1950 |
| 2,528,506 | Foye | Nov. 7, 1950 |
| 2,530,852 | Bixby | Nov. 21, 1950 |

OTHER REFERENCES

A. F. Smith: "Plasticizers for Vinyl Chloride," page 14.